United States Patent
Lo et al.

(10) Patent No.: US 9,708,441 B2
(45) Date of Patent: Jul. 18, 2017

(54) LOW TEMPERATURE SHAPE MEMORY THERMOSETTING EPOXY, FILM MATERIAL AND PRODUCING METHOD THEREOF

(71) Applicant: Plastics Industry Development Center, Taichung (TW)

(72) Inventors: Kuo-Shu Lo, Taichung (TW); Chi-An Huang, Taichung (TW)

(73) Assignee: Plactis Industry Development Center, Taichung (TW)

( * ) Notice: Subject to any disclaimer, the term of this patent is extended or adjusted under 35 U.S.C. 154(b) by 44 days.

(21) Appl. No.: 14/506,718

(22) Filed: Oct. 6, 2014

(65) Prior Publication Data
US 2016/0096958 A1    Apr. 7, 2016

(51) Int. Cl.
*C08G 59/18* (2006.01)

(52) U.S. Cl.
CPC .................................. *C08G 59/18* (2013.01)

(58) Field of Classification Search
CPC .............................. C08L 63/00; C08G 59/18
See application file for complete search history.

(56) References Cited

U.S. PATENT DOCUMENTS

| | | | |
|---|---|---|---|
| 4,990,545 A * | 2/1991 | Hourai | B29C 61/003 427/261 |
| 2004/0117955 A1* | 6/2004 | Barvosa-Carter | A44B 18/0007 24/442 |
| 2007/0275020 A1* | 11/2007 | Lendlein | A61K 8/90 424/401 |
| 2008/0262188 A1* | 10/2008 | Xie | C08G 59/42 528/98 |
| 2008/0269420 A1* | 10/2008 | Tong | B29C 61/003 525/208 |
| 2009/0035350 A1* | 2/2009 | Stankus | A61L 27/18 424/424 |
| 2010/0035049 A1* | 2/2010 | Xie | C08J 7/04 428/333 |
| 2013/0177409 A1* | 7/2013 | Schumacher | A61M 1/101 415/208.1 |
| 2013/0178550 A1* | 7/2013 | Aou | C08G 18/283 521/176 |
| 2013/0186562 A1* | 7/2013 | Finter | C08G 59/4246 156/293 |
| 2013/0225706 A1* | 8/2013 | Ma | C08G 18/4072 521/110 |

OTHER PUBLICATIONS

Chang, L.C. and Read, T.A., Institute of Metals Division—Plastic Deformation and Diffusionless Phase Changes in Metals—The Gold-Cadmium Beta Phase (Summary/Abstract), AIME Transactions, Jan. 1, 1952, 1 page, OneMine.org.

* cited by examiner

*Primary Examiner* — Megan McCulley
(74) *Attorney, Agent, or Firm* — Alan D. Kamrath; Kamrath IP Lawfirm, P.A.

(57) ABSTRACT

A low temperature shape memory thermosetting epoxy has a epoxy, a curing agent, a modifying material and a functional material. The curing agent is fatty amine, polyamide and aromatic amino compound. The modifying material is polyester polyol, polyether polyol, aromatic diamine, and silicon compound. The functional material is boron trifluoride, terminal carboxyl group, calcium carbonate, pigment, and mixture thereof. Thus, the epoxy is deformable and is shape memorable under room temperature.

5 Claims, 1 Drawing Sheet

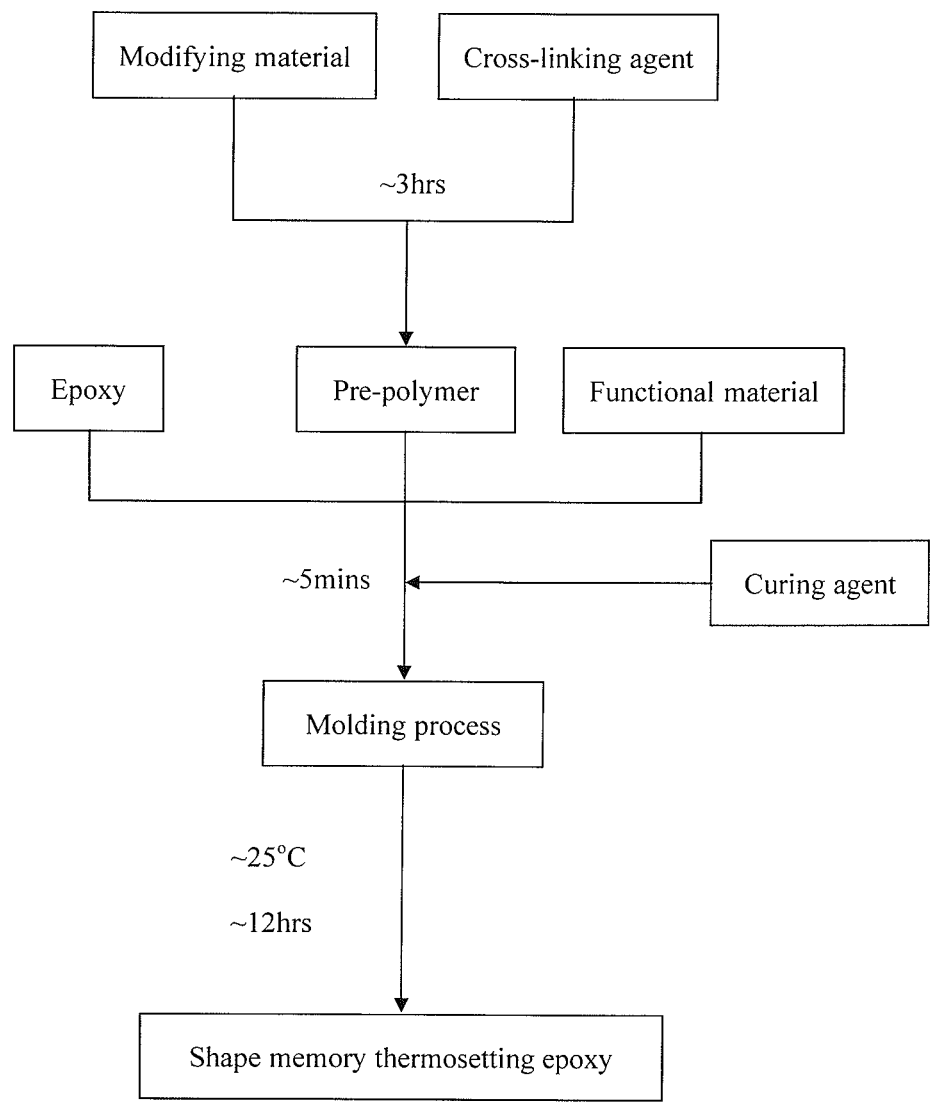

LOW TEMPERATURE SHAPE MEMORY THERMOSETTING EPOXY, FILM MATERIAL AND PRODUCING METHOD THEREOF

BACKGROUND OF THE INVENTION

1. Field of Invention

This invention is related to a thermosetting material and, more particularly, to a shape memory thermosetting epoxy.

2. Description of the Related Art

Epoxy became popular in commercial use in 1950. Epoxy was commonly used to spray on circuit boards and electronic components because epoxy has stable material properties. Chemical bonds of epoxy like epoxide groups, amino group and hydroxyl group were linked into a rigid 2-D or 3-D structures in curing processes, so that epoxy became more stable and resistible.

The first material being known to have shape memory properties is shape memory metal alloy (SMA) discovered by Chang et al. in 1952. TiNi (Nitinol), CuZnAl and FeNiAl alloys are three major type of SMAs. These materials have been proposed for various uses in aeronautical, electronic and mechanical industries. SMAs were limited to be used on specific products because of high cost issues. A shape memory polymer (SMP) has been successfully developed and widely used because of lower costs and of being easier for production. Polyvinyl methyl ether (PVME), polyvinyl acetate (PVA), 1,4-trans polyisoprene (TPI), polyethylene (PE), polystyrene (PS) and polyurethane (TPU) are some of SMPs being discovered. The above mention of SMP still can't be widely used in industry because of weak intensity and rigidity.

SUMMARY OF THE INVENTION

In order to solve the disadvantages and shortcoming of the SMP such as weak intensity and rigidity, the present invention provides a producing method of a shape memory thermosetting epoxy including the steps of:

mixing a modifying material and a cross-linking agent to form a pre-polymer;

mixing epoxy, the pre-polymer and a functional material to form a major blending agent;

mixing a curing agent and the major blending agent to form a fluid shape memory thermosetting material; and molding the fluid shape memory thermosetting material into a required shape.

Thus, the present invention achieves advantages as below.

1. The present invention is a shape memory thermosetting material which is deformable in a certain range of temperature and is shape memorable under room temperature.

2. The present invention may be shaped as required by demand with a very simple method.

3. The present invention is fluid before shaping and may be deformed under a wide range of temperature by adjusting the content of the cross-linking agent.

4. The present invention is suitable for various molding processes, like a compression molding process or an injection molding process, and is able to reduce at least 70% of mould costs for producing large product items.

BRIEF DESCRIPTION OF THE DRAWINGS

The FIGURE is a producing process flow chart in accordance with the present invention.

DETAILED DESCRIPTION OF THE INVENTION

With reference to the FIGURE, a preferred embodiment of a producing method of a shape memory thermosetting epoxy in accordance with the present invention has the steps of:

STEP 1. mixing a modifying material and a cross-linking agent for about 2~4 hours to form a pre-polymer. The modifying material may be polyester polyol, polyether polyol, aromatic diamine or silicone compounds. The cross-linking agent may be a polyamine cross-linking agent.

Producing the pre-polymer may have the steps comprising (1) stirring the modifying material in a reaction flask in a low speed by a blender; (2) heating to a certain temperature (e.g. 80 ° C. +/−); and (3) adding the cross-linking agent slowly and stirring continually to form the pre-polymer. The stirring time thereof may be 2~4 hours.

STEP 2. mixing epoxy, the pre-polymer and a functional material uniformly to form a major blending agent. The mixing time thereof may be but is not limited to 3~7 minutes. The functional material may be but is not limited to boron trifluoride, terminal carboxyl group, calcium carbonate, unsaturated polyester, phenolic resin, pigment, polyamine, antifoaming agent, surfactant or phenyl solvent. The phenolic resin is selected from a group consisted of bisphenol-A phenolic resin, novolac resin, methylphenyl novolac resin, bisphenol-A novolac resin, phenol aralkyl resin, dicyclopentadiene phenolic novolac resin, amino triazine phenolic novolac resin, polybutadiene phenolic novolac resin, biphenyl type resin and a mixture thereof.

The major blending agent may be prepared by blending the epoxy with the pre-polymer and the functional material in a container for few minutes such as 5~10 mins by a blender with 1000 RPM +/−10% to form the major blending agent.

STEP 3. mixing a curing agent and the major blending agent to form a fluid shape memory thermosetting material. The curing agent may be fatty amine, polyamide or aromatic amino compound.

STEP 4. molding the fluid shape memory thermosetting material into required shape. The fluid shape memory thermosetting material can be molded by an infusion process, a spray process, a blade coating process, a hot-pressing process and a resin transfer molding process.

In a preferred embodiment, the fluid shape memory thermosetting material consists in the major blending agent for 30 wt %~95 wt %, the modifying material for 2 wt %~50 wt % and the functional material for 0.1 wt %~10 wt %. The fluid shape memory thermosetting material is able to be reshaped as a required shape under a temperature range around 80° C.~160° C.

The shape memory ability mechanism of the present invention may be stated as follows. The cross-linking agent and the curing agent are respectively selected to have different reaction rates with the major blending agent. The cross-linking agent is first added to activate a cross-link reaction with the major blending agent. The cross-link reaction may be a substitution reaction with side-chains to the major blending agent. The curing agent acts like an inhibitor added to terminate the cross-link reaction. Since the molecular weight of the curing agent is smaller than the cross-linking agent, the curing agent has a faster reaction rate than the cross-linking agent. The major blending agent then comprises a network structure for shaping as the required shape at a designed temperature range.

[Embodiment 1]

Step 1. Mixing 20 wt % of the modifying material and 5 wt % of the cross-linking agent for 20 minutes to form the pre-polymer;

Step 2. mixing 50 wt % of epoxy, 0.5 wt % of antifoaming agent, 0.5 wt % of surfactant and the pre-polymer for 5~10 minutes to form a major blending agent;

Step 3. mixing 30 wt % of the curing agent and the major blending agent and then stirring continually for 3 minutes to form the fluid shape memory thermosetting material;

Step 4. pouring the fluid shape memory thermosetting material into a mould and forming a shape memory thermosetting epoxy after curing.

The present invention also provides an automatic shape memory film which is able to be mounted smoothly on a skin surface of a human's body. The automatic shape memory film is able to attach with other material and has a centimeter to a millimeter of thickness.

According to the above mentioned, the invention has advantages listed as below:

1. The present invention is a shape memory thermosetting material which is deformable in a certain range of temperature and is shape memorable under room temperature.

2. The present invention may be reshaped by demand.

3. The present invention is fluid before shaping and may be deformed under a wide range of temperature by adjusting the content of the cross-linking agent.

4. The present invention is suitable for various molding processes, like hot-pressing process or injection molding process, and is able to reduce at least 70% of mould costs for producing large product items.

What is claimed is:

1. A shape memory thermosetting epoxy comprising a modifying material, a cross-linking agent, epoxy, a functional material, and a curing agent; wherein:

the modifying material comprises polyester polyol or polyether polyol;

the shape memory thermosetting epoxy is deformable at a range of temperature and is shape memorable under room temperature;

the cross-linking agent activates a cross-link reaction of the shape memory thermosetting epoxy;

the curing agent is an inhibitor terminating the cross-link reaction of the shape memory thermosetting epoxy;

the modifying material and the cross-linking agent are mixed to form a pre-polymer;

the pre-polymer, the epoxy and the functional material are mixed to form a major blending agent;

the major blending agent and the curing agent are mixed to form a fluid shape memory thermosetting material;

the fluid shape memory thermosetting material comprises the major blending agent in an amount of 30 wt %~95 wt %, the modifying material in an amount of 2 wt %~50 wt % and the functional material in an amount of 0.1 wt %~10 wt %; and the fluid shape memory thermosetting material is deformable at 80° C.~160° C. and is shape memorable under room temperature.

2. The shape memory thermosetting epoxy as claimed in claim 1, wherein:

the functional material comprises boron trifluoride, terminal carboxyl group, calcium carbonate, unsaturated polyester, phenolic resin, pigment, polyamine, antifoaming agent, surfactant or phenyl solvent;

the phenolic resin is selected from a group of bisphenol-A phenolic resin, novolac resin, methylphenyl novolac resin, bisphenol-A novolac resin, phenol aralkyl resin, dicyclopentadiene phenolic novolac resin, amino triazine phenolic novolac resin, polybutadiene phenolic novolac resin, biphenyl type resin and mixtures thereof; and the curing agent is fatty amine, polyamide or aromatic amino compounds.

3. The shape memory thermosetting epoxy as claimed in claim 1, wherein the shape memory thermosetting epoxy comprises a film material.

4. A producing method of a shape memory thermosetting epoxy comprising:

mixing a modifying material and a cross-linking agent to form a pre-polymer, wherein the modifying material is polyester polyol or polyether polyol, wherein the cross-linking agent is a polyamine;

mixing epoxy, the pre-polymer and a functional material to form a major blending agent, with the cross-linking agent activating a cross-link reaction with the major blending agent;

mixing a curing agent with the major blending agent to form a fluid shape memory thermosetting material, with the curing agent terminating the cross-link reaction; and molding the fluid shape memory thermosetting material as a required shape, wherein:

the functional material is boron trifluoride, terminal carboxyl group, calcium carbonate, unsaturated polyester, phenolic resin, pigment, polyamine, antifoaming agent, surfactant or phenyl solvent;

the phenolic resin is selected from a group of bisphenol-A phenolic resin, novolac resin, methylphenyl novolac resin, bisphenol-A novolac resin, phenol aralkyl resin, dicyclopentadiene phenolic novolac resin, amino triazine phenolic novolac resin, polybutadiene phenolic novolac resin, biphenyl resin and mixtures thereof;

the curing agent is fatty amine, polyamide or aromatic amino compounds;

the fluid shape memory thermosetting material comprises the major blending agent in an amount of 30 wt % 95 wt %, the modifying material in an amount of 2 wt %~50 wt % and the functional material in an amount of 0.1 wt %~10 wt %; and the fluid shape memory thermosetting material is deformable at 80° C.~160° C. and is shape memorable under room temperature.

5. The producing method of the shape memory thermosetting epoxy as claimed in claim 4, wherein molding the fluid shape memory thermosetting material comprises processing by an infusion process, a spray process, a blade coating process, a hot-pressing process or a resin transfer molding process to form the required shape.

* * * * *